Dec. 10, 1968    M. S. MALTENFORT    3,415,431
HOSIERY BOARDING FORM
Filed Aug. 9, 1967

INVENTOR
Martin S. Maltenfort

BY *Lawrence P. Field*

ATTORNEY 3,415,431
HOSIERY BOARDING FORM
Martin S. Maltenfort, Glen Farm, Md.
(603 E. Pulaski Highway, Elkton, Md. 21921)
Filed Aug. 9, 1967, Ser. No. 659,425
3 Claims. (Cl. 223—75)

ABSTRACT OF THE DISCLOSURE

A form for boarding hosiery in which the form is provided with transparent or translucent windows and means for retaining said windows in said form.

---

This invention relates to forms for boarding hosiery and more particularly to the installation of glass or plastics or other transparent or translucent inserts into aluminum forms used for preboarding, dyeboarding or postboarding hosiery. These inserts permit inspection of the toe and heel seams of hosiery to insure that they are properly aligned. This inspection could be made with holes in the forms, but this is undesirable as the dyeing characteristics of the synthetic yarn changes in the area of the hole and the non-uniformity of the finished product is undesirable.

In one previously known construction described in Russell, United States Patent 2,914,226 issued Nov. 24, 1959, the body of the boarding form is composed of aluminum or other suitable opaque material and windows of clear glass are disposed therein, the form and windows being encapsulated or covered by a solidified transparent plastic film.

Another common method for installing glass inserts in the boarding form is by the use of adhesives. However, under the conditions of use in dyeboarding (200° F. with chemical and surfactant solutions) and preboarding and postboard (wet steam up to 260° F.) no presently known adhesive has a sufficient service life. Epoxy and modified epoxy adhesives bond well initially, but soon become brittle and lose adhesion. Silicone rubber adhesives resist heat, but do not bond well enough to the glass and metal to provide long term adhesion. Another serious disadvantage with adhesive bonding is that the extreme difference in coefficient of expansion between glass and aluminum and adhesive itself often causes enough stress to cause the glass to shatter.

In still another known procedure which avoids the disadvantages of the above, a glass insert with a larger bevel is inserted in a hole provided in the boarding form and the soft aluminum is peened over or spun around the glass. This deforms the aluminum around the glass to form a mechanical lock. While this method is a positive system, it has several disadvantages including the following:

(1) Installation must be done in a factory set up to do this work as the equipment is complex.

(2) Recessed area around glass insert is detrimental as the hosiery does not touch this annular area and dyeing is adversely affected.

(3) If a glass insert breaks, the hole must be drilled or reamed out to a size larger than the spun area in order to install a new oversize glass insert.

(4) Most boarding forms are manufactured with a protective coating, such as anodizing. Such protective coatings are broken or removed by the spinning or peening process.

(5) Because of the direct mechanical connection between the glass and aluminum, the glass is subjected to severe strains due to the substantial difference in coefficients of expansion between the glass and aluminum, since the form is used at temperatures well above room temperature in conventional dyeboarding.

The present invention makes possible the provision of see through openings in hosiery boarding forms without the disadvantages of the above described methods.

The invention will be better understood from the description which follows taken with the accompanying drawings in which.

Figure 1:
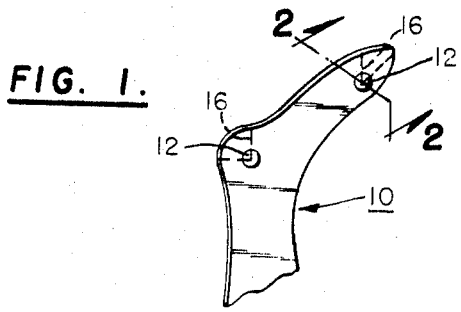
FIGURE 1 shows the heel and toe portion of a boarding form provided with windows according to the invention.

To prepare the boarding forms of the present invention holes 12 are punched in the heel and toe areas of hosiery boarding forms 10 as illustrated in FIGURE 1. A preferred hole size is 1.25″ diameter, but larger or smaller inserts may be installed. The broken lines 16 show the location of the heel and toe seams. After punching, the sharp edges of the holes 12 are bevelled and polished by any convenient known metal working techniques.

Figure 2:
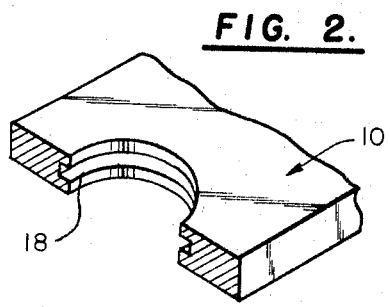
FIGURE 2 is a section taken on plane 2—2 through a hole in the form of FIGURE 1.
Figure 3:
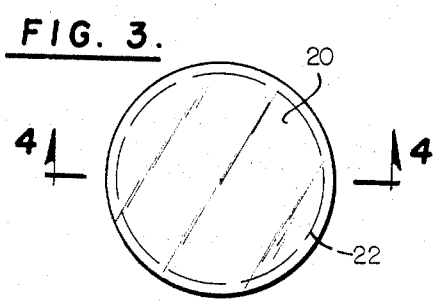
FIGURE 3 is a plan view of a glass insert.

Then a groove 18 is cut inside of each hole 12 midway through its thickness. This is illustrated in FIGURE 2. A usual thickness of hosiery boarding forms is 0.125 inch. The groove 18 is cut with a rotating cutting tool which can expand or rotate out to a predetermined diameter. There are many methods for cutting satisfactory grooves and this procedure is not considered to be a part of this invention.

Figure 4:
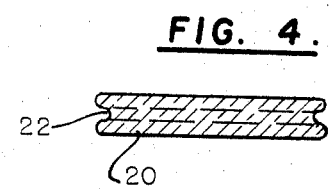
FIGURE 4 is a section on plane 4—4 of FIGURE 3.

The glass inserts 20 placed in holes 12 may be any heat resistant glass. A shallow groove 22 is machined around the periphery of the glass insert at the center of thickness. This is shown in FIGURE 4. To minimize strains, it is preferred that groove 22 be semicircular, however, other configurations are possible providing that sharp corners are avoided as stress concentrations occur at such points.

Figure 5:
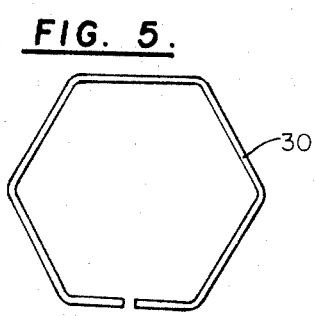
FIGURES 5, 6 and 7 are views of retainer rings used to assemble the insert of FIGURE 3 in the form of FIGURE 1.
Figure 6:
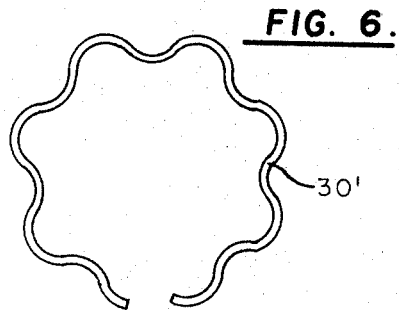
Figure 7:
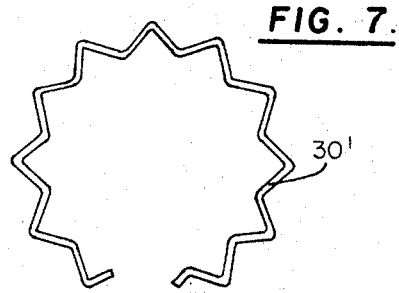

In order to complete the assembly of insert 20 into boarding form 10, a metal spring-retainer 30 is provided which engages both in the grooves of the glass and metal. A preferred design for such a spring-retainer is shown in FIGURE 5. Other spring-retainer configurations are shown in FIGURES 6 and 7.

Furthermore, a rubber or plastic "O" ring could be provided to engage the glass and metal in both grooves. However, such an O ring does not have the holding power or the chemical resistance of the stainless steel retainer 30.

Figure 8:
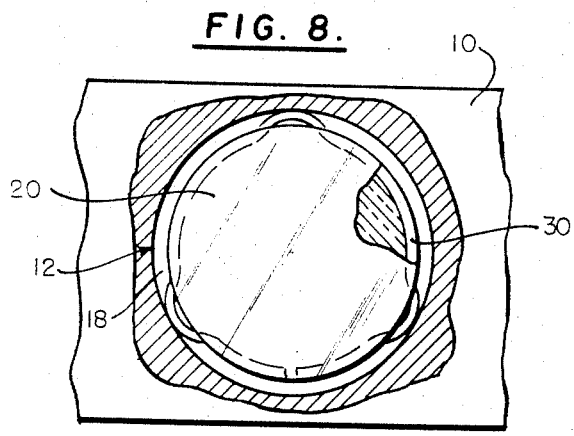
FIGURE 8 is a view of a boarding form, partly broken away to show the insert as it is installed.

The design of the stainless steel retainer is quite important. In the preferred design, when the glass is inserted, the wire retainer is distorted in the manner shown in FIGURE 8, in which the wire retainer bends to the shape of the glass insert with a maximum amount of contact, thus minimizing concentrations of stress on this fragile member. The highest contact pressure is against the circumference of the groove in the aluminum where it can easily be retained for maximum holding power.

Another advantage of this invention is the fact that the relatively delicate glass insert is essentially "free floating" out of contact with the aluminum. Therefore, the spring retainer takes up the relative movement between the glass and aluminum, thereby maintaining constant compression against the glass. It has been found that the holding power remains approximately constant over and beyond the range of temperature to which hosiery boarding forms are subjected.

Having now described a preferred embodiment of my invention it is not intended that it be limited except as may be required by the appended claims.

I claim:

1. In a boarding form for hosiery comprising a thin generally flat solid form shaped to the contours of an article of hosiery and made of opaque material with at least one window of transparent or translucent material inserted into an opening provided for the same in said form; the improvement which comprises: providing a groove in the window receiving opening in said form and a groove about the perimeter of said window and disposing a resilient retaining means in both of said grooves whereby said window is held in said boarding form and is not severely stressed when said form is subjected to the elevated temperatures conventional in dyeboarding, preboarding and postboarding.

2. The combination of claim 1 wherein the window is circular and the groove is a semicircular channel encircling the perimeter of said window midway between the upper surface and the lower surface of said window.

3. The combination of claim 1 wherein the retaining means is a flexible stainless steel wire.

References Cited

UNITED STATES PATENTS

| 1,813,388 | 7/1931 | De Witt | 223—75 |
| 2,914,226 | 11/1959 | Russell | 223—75 |

FOREIGN PATENTS

| 1,313,697 | 11/1962 | France. |
| 1,188,545 | 3/1965 | Germany. |

PATRICK D. LAWSON, *Primary Examiner.*

GEORGE V. LARKIN, *Assistant Examiner.*